(Model.)

R. H. MATHER.
Dynamometer for Rotary Shafts.

No. 235,164. Patented Dec. 7, 1880.

Witnesses
Wendell R. Curtis
James J. Greene.

Inventor
Richard H. Mather
By W. E. Simonds
Atty.

UNITED STATES PATENT OFFICE.

RICHARD H. MATHER, OF WINDSOR, CONNECTICUT.

DYNAMOMETER FOR ROTARY SHAFTS.

SPECIFICATION forming part of Letters Patent No. 235,164, dated December 7, 1880.

Application filed September 29, 1880. (Model.)

*To all whom it may concern:*

Be it known that I, RICHARD H. MATHER, of Windsor, (Hartford P. O.,) in the county of Hartford and State of Connecticut, have invented a certain new and useful Improvement pertaining to a Dynamometer for Rotating Machinery, of which the following is a description, reference being had to the accompanying drawings, where—

Figure 1:
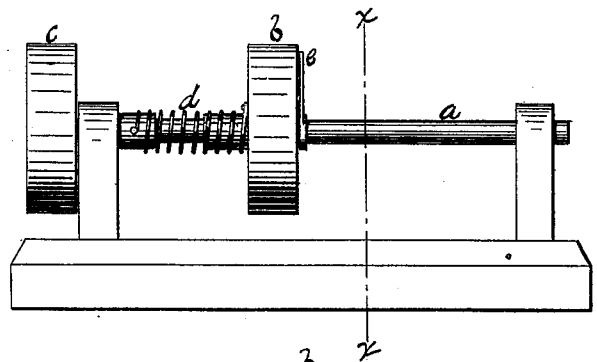
Figure 2:
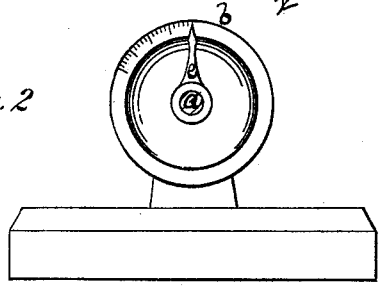
Figure 3:
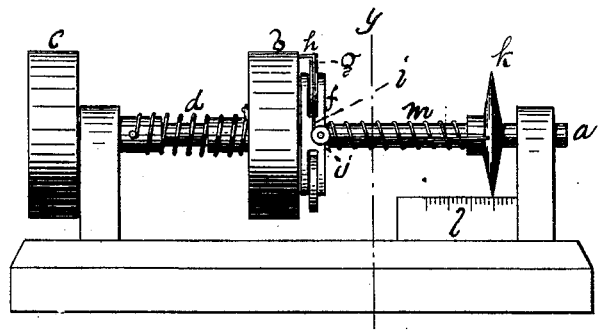
Figure 4:
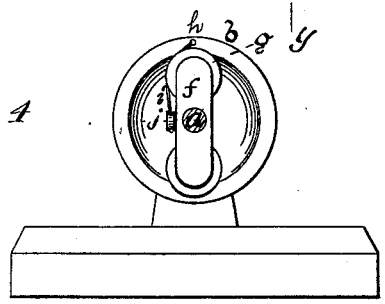

Figure 1 is a side view of a device embodying said improvement. Fig. 2 is a view of the same in vertical cross-section on plane $xx$. Fig. 3 is a side view of a device embodying said improvement in a completer and more convenient form or modification. Fig. 4 is a view of the device shown in Fig. 3 in vertical cross-section on the plane $yy$.

My present invention relates to certain improvements in devices for measuring power, in which a rotary shaft is employed between the driving-power and the work to be performed, and in which a loose wheel is mounted on said shaft, and the amount of its loose or independent motion is indicated by the torsion of a spring surrounding the shaft; and my invention consists in certain registering and other mechanism, to be hereinafter described.

Referring now to Figs. 1 and 2, the letter $a$ denotes a rotating shaft, to which the driving power is applied by a belt running on wheel $b$, which has rotarily loose or independent motion on said shaft, and the power is taken off said shaft by a belt running on wheel $c$. The wheel $b$ is attached to said shaft through the medium of spring $d$, coiled about said shaft, with one end fast to the shaft and the other end fast to wheel $b$. The spring needs to be of a strength adapted to the purpose in hand and regularly compressible in accordance with the power put upon it.

When driving power is applied to the wheel $b$ this wheel will first rotate upon and independently of the shaft until spring $d$ is subjected to torsional compression sufficient to equal the resistance to rotation offered by the shaft, when shaft $a$ and wheel $b$ will rotate together.

As spring $d$ is to be made of known strength, the amount of loose motion or independent rotation that wheel $b$ has before shaft $a$ moves with it will be in exact ratio to the resistance to rotation offered by shaft $a$. To measure the amount of this loose motion of wheel $b$ the following is a very simple means: The radial finger $e$ (really an index) is fast on shaft $a$, and the side of wheel $b$ being graduated, the index-finger standing normally at zero or 0, the amount of the loose motion of wheel $b$ on shaft $a$ can be read off on this graduated scale. It is, however, obvious that this can be done only while the shaft and the wheel $b$ are revolving at a slow speed. This particular objection may be obviated by making annular ways on the side of wheel $b$, just under or radially inside the graduated scale, and placing in the ways a slide to be acted on by the index-finger and left at the limit of the loose play; but this last method and means make it necessary to stop the rotation of the shaft and wheel (where the speed of rotation is great) in order to ascertain the position of the slide.

A form of index which is subject to none of these objections is shown in Figs. 3 and 4, in which figures the shaft, the wheels, and the connecting-spring are lettered the same as in Figs. 1 and 2.

On shaft $a$ is fixed a radial arm, $f$, bearing pulley $g$. From a pin, $h$, on the side of pulley $b$ a cord, $i$, runs around pulley $g$, thence around pulley $j$ on the side of arm $f$ to the index or indicator-disk $k$, which is loose on shaft $a$. As pulley $b$ turns with loose motion on shaft $a$ the cord pulls the index-disk toward wheel $b$, and the amount of this loose motion is denoted by the position of the index with reference to the graduated scale $l$. The spring $m$ returns the index to the zero-point when permitted, and the power of this spring may well be so small as to be of no practical account. It is, however, quite practical to make this spring strong and have its resistance taken into account, and even to dispense with spring $d$ and have this spring $m$ do the whole work.

The power transmitted in most cases where this device is likely to be of value is generally reckoned or denominated in foot-pounds, which, in the use of this device, is arrived at by multiplying the speed of wheel $b$—*i.e.*, the distance traveled by a point upon its periphery in a minute of time—by the number of pounds resistance to rotation offered by shaft $a$, which is told by the index.

The device may be kept in constant use and operation, so that the power used or transmitted through it may be noted at any time, or the wheel $b$ may be kept fast on the shaft ordinarily by a set-screw or the like and the screw loosened when it is desired to take an observation. The cord $i$ may be directly connected with the periphery of the loose wheel $b$, and its pin $h$ dispensed with if desired.

I claim as my invention—

1. In combination, the rotary shaft $a$, fixed wheel $c$, loose wheel $b$, the spring $m$, the radial arm $f$, with its pulleys $g$ $j$, the cord $i$, the index-disk $k$, sliding on shaft $a$, and the scale $l$, the loose wheel $b$ being located between the fixed wheel $c$ and the sliding index-disk $k$, and the other parts arranged as described, for the purpose set forth.

2. The combination of the shaft $a$, fixed wheel $c$, loose wheel $b$, the springs $d$ and $m$, the radial arm $f$, with its pulleys $g$ $j$, the cord $i$, index-disk $k$, and scale $l$, all constructed and arranged to operate as and for the purpose described.

RICHARD H. MATHER.

Witnesses:
W. E. SIMONDS,
JAMES J. GREENE.